(12) United States Patent
Baer

(10) Patent No.: US 7,298,401 B2
(45) Date of Patent: Nov. 20, 2007

(54) METHOD AND APPARATUS FOR REMOVING FLICKER FROM IMAGES

(75) Inventor: Richard L. Baer, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 859 days.

(21) Appl. No.: 09/927,201

(22) Filed: Aug. 10, 2001

(65) Prior Publication Data

US 2003/0030744 A1    Feb. 13, 2003

(51) Int. Cl.
*H04N 9/73* (2006.01)
(52) U.S. Cl. .................. 348/226.1; 348/228.1
(58) Field of Classification Search ............ 348/226.1, 348/227.1, 228.1, 370, 222.1; 359/229; 382/274
See application file for complete search history.

(56) References Cited

U.S. PATENT DOCUMENTS

| | | | | |
|---|---|---|---|---|
| 4,774,588 | A * | 9/1988 | Noda et al. .................. 348/297 |
| 5,293,238 | A * | 3/1994 | Nakano et al. ........... 348/226.1 |
| 5,793,886 | A | 8/1998 | Cok ........................... 382/169 |
| 5,960,153 | A | 9/1999 | Oster et al. .................. 386/117 |
| 6,208,433 | B1 * | 3/2001 | Iwakawa et al. ............. 358/463 |
| 6,271,884 | B1 * | 8/2001 | Chung et al. ............... 348/370 |
| 6,295,085 | B1 * | 9/2001 | Munson et al. ........... 348/226.1 |
| 6,507,365 | B1 * | 1/2003 | Nakamura et al. ........... 348/296 |
| 6,573,933 | B1 * | 6/2003 | Takayama ................ 348/226.1 |
| 6,710,818 | B1 * | 3/2004 | Kasahara et al. ............ 348/607 |
| 6,882,363 | B1 * | 4/2005 | Oda et al. ................. 348/226.1 |

FOREIGN PATENT DOCUMENTS

| | | |
|---|---|---|
| EP | 1 324 598 A2 | 7/2003 |
| JP | 11-252446 | 9/1999 |
| JP | 2000004382 | 1/2000 |
| JP | 2000165752 | 6/2000 |

OTHER PUBLICATIONS

Ohuchi, Toshiaki et al., "A Robust Method of Image Flicker COrrection for Heavily—Corrupted Old Film Sequences", Proceedings 2000 International Conference on Image Processing, vol. 2, Sep. 10, 2000, pp. 672-675.

* cited by examiner

*Primary Examiner*—Vivek Srivastava
*Assistant Examiner*—Yogesh Aggarwal
(74) *Attorney, Agent, or Firm*—RatnerPrestia

(57) ABSTRACT

Method and apparatus for removing image artifacts from an image of a scene illuminated by a periodically varying light source such as a fluorescent light source. The image is represented by image data, and the method has the steps of determining a flicker function and processing the image data using the flicker function to remove the image artifacts from the image. The method and apparatus operate on data of a single image, do not require any additional input other than values of the flicker and frame periods, and do not require that the flicker be independently monitored. The method and apparatus is suitable for removing image artifacts from an image represented by image data collected by a CMOS image sensor utilizing a rolling shutter.

17 Claims, 5 Drawing Sheets

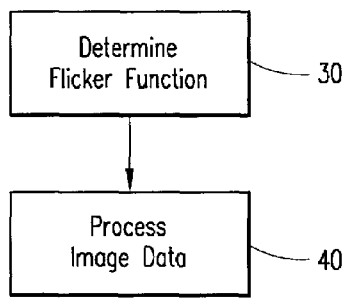
FIG. 7
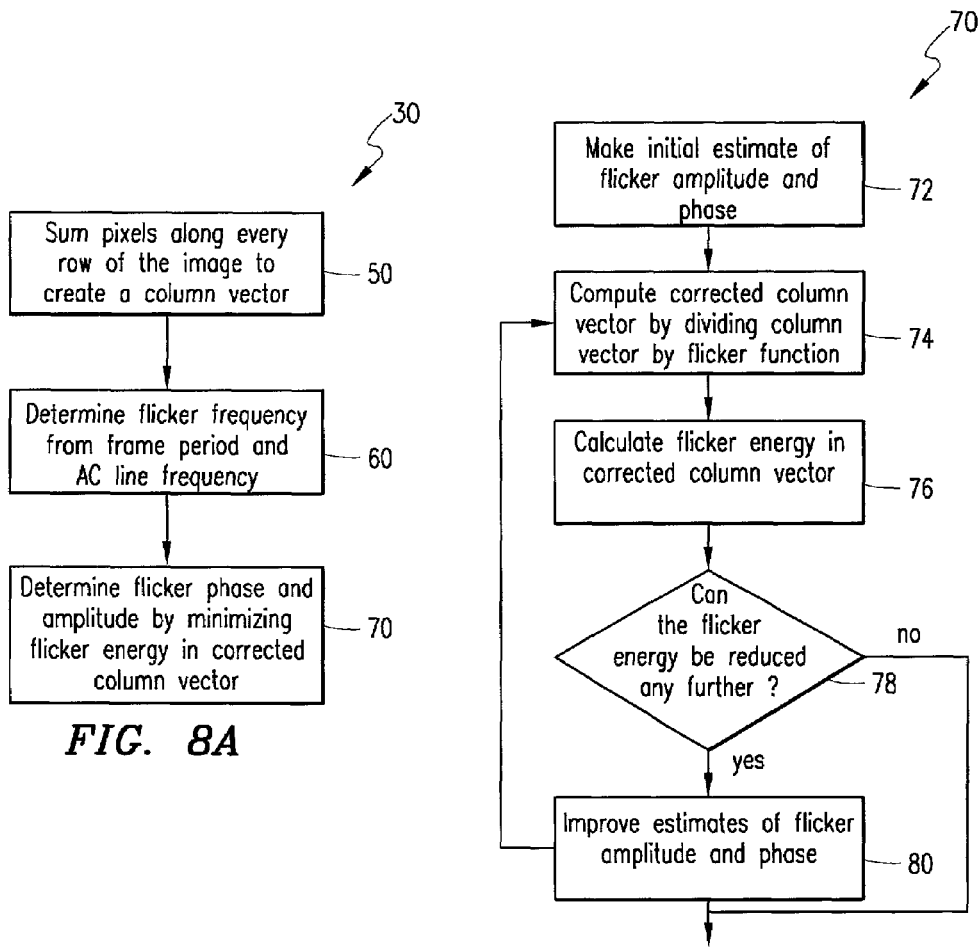
FIG. 8A
FIG. 8B

METHOD AND APPARATUS FOR REMOVING FLICKER FROM IMAGES

BACKGROUND OF THE INVENTION

1. Technical Field of the Invention

The present invention relates generally to the image processing field; and, more particularly, to a method and apparatus for removing image artifacts from images that are produced by a periodically varying light source.

2. Description of Related Art

In a CMOS (Complementary Metal Oxide Semiconductor) active-pixel image sensor, a rolling shutter is commonly used to provide exposure control. A rolling shutter may be implemented by sequentially resetting each row of sensors in an image sensor array and sequentially reading the values of each row at a later time. The exposure period is equal to the interval between reset and read out, and the frame period is the time required to read the values of every row in the array.

FIG. 1 is a diagram that schematically illustrates the operation of a rolling shutter to assist in providing a clear understanding of the present invention. Consider an image data array having 100 rows (for clarity, only 9 rows are illustrated in FIG. 1). Assume that the time required to read out a single row, i.e., the row period, is T; and that the exposure period, illustrated by arrow 10 in FIG. 1, is set to n*T. The exposure of row 1 will begin at time t=0, and the row will be read out at time t=n*T. The exposure of row 2 will begin at time t=T, and row 2 will be read out at time t=(n+1)*T. Row 100 of the array will begin exposure at time t=99*T, and that row will be read out at time t=(n+99)*T.

One characteristic of a rolling shutter is that the exposure for each row occurs over a different time interval as is shown in FIG. 1. Accordingly, if the illumination of a scene varies with time, the brightness of the captured image will vary from row to row. If the period of the variation in the illumination level of the scene is longer than the integration period of the rolling shutter and shorter than the frame period, the variation will result in the appearance of image artifacts in the form of horizontal bands in the image. The number of bands in the image will be equal to a flicker period divided by the frame period.

These variations in the illumination level of a light source over time are known as "flicker", and the horizontal bands in the image are referred to as image artifacts or as a "flicker pattern". Fluorescent lamps, for example, have very strong flicker. The phosphors in the lamp are excited at each peak of the power line frequency and decay between peaks. The light pulses that are produced have a flicker frequency that is twice that of the AC power line. Incandescent bulbs do not exhibit flicker because the thermal masses of their filaments are sufficiently large to prevent the filaments from cooling significantly between AC peaks. The effect of flicker on the output of a CMOS image sensor is illustrated in the schematic image 14 of FIG. 2 in which the periodic horizontal bars 16 are quite apparent and significantly detract from the overall quality of the image.

The number of horizontal bars in an image such as shown in FIG. 2 is equal to the ratio of the frame period to the flicker period. The amplitude of the horizontal bars depends on characteristics of the particular light source and on the integration period of the rolling shutter of the CMOS image sensor.

Several methods have been devised to remove frame-to-frame flicker. For example, U.S. Pat. No. 5,793,886 discloses a method in which the histograms of different image frames are compared so that the variation in the mean illumination level as a function of time can be removed. The method described, however, does not apply to a situation wherein only a single image frame is available and wherein the flicker is manifested as a series of horizontal bands in the resulting image.

In other known methods to remove frame-to-frame flicker, the light level of the illuminant is monitored during the frame exposure. For example, in the method described in U.S. Pat. No. 6,208,433; a separate sensor is used to monitor the fluctuations of the illuminant; and the output of this sensor is used to correct the image. In U.S. Pat. No. 5,960,153, a linear image sensor is used to both capture the image and to measure the illuminant variation. The illuminant variation is used to control the exposure timing so that flicker does not appear in the final image.

In yet another known method, flicker is avoided by restricting the exposure period to integer multiples of the flicker period. Under such circumstances, each row integrates light over an integer number of complete cycles of the illuminant's fluctuation. As a result, the integrated light level is caused to be the same for each row, and bands are prevented from appearing in the image. A disadvantage of this method is that the exposure period cannot be reduced below the flicker period. If the illuminant is very bright, and the exposure period cannot be reduced; the resulting image will be overexposed. Such a problem may occur when a scene is illuminated with bright fluorescent lights or when the camera is pointed directly at a fluorescent light.

In general, known methods for removing frame-to-frame flicker from an image require several successive image frames for processing, require that the flicker be independently monitored, or require additional inputs. Accordingly, known methods for removing flicker are not fully satisfactory. What is needed is a method and apparatus for removing flicker produced by a periodically varying light source that operates on a single image, that does not require any additional input, other than values of the flicker and frame periods, and that does not require that the flicker be independently monitored. What is also needed is a method and apparatus that can be effectively used to capture images with greatly reduced flicker even under very bright fluorescent illumination.

SUMMARY OF THE INVENTION

The present invention provides a method and apparatus for removing image artifacts from an image produced by a periodically varying light source, such as a fluorescent light source. A method according to the invention provides for removing image artifacts from an image represented by image data. In the method, a flicker function is determined; and the image data is processed using the flicker function to remove the image artifacts.

In the course of the present invention, it has been discovered that image artifacts can be removed from or greatly reduced in an image by processing the image data with a flicker function that models light emission of the light source that illuminates a scene being imaged. The invention is particularly suitable for removing image artifacts from images represented by image data collected from a CMOS image sensor utilizing a rolling shutter.

According to an embodiment of the present invention, the image data representing the image comprises an image data array comprised of a plurality of rows of image data, and the step of processing the image data comprises dividing the image data by the flicker function on a row-by-row basis.

Determining the flicker function of the image data involves determining values of parameters associated with an a priori flicker model. In particular, to determine the flicker function, the flicker frequency, flicker amplitude and flicker phase of the light source are determined. According to an embodiment of the invention, the flicker frequency, flicker amplitude and flicker phase are determined by summing the pixels along every row of the image data array to create a column vector, determining the flicker frequency from the product of the frame period and the AC line frequency in cycles per image frame, and determining the flicker amplitude and phase by minimizing flicker energy in a corrected column vector.

More particularly, the flicker amplitude and phase are determined, according to a further embodiment of the invention, by making an initial estimate of the flicker amplitude and phase, computing a corrected column vector by dividing the created column vector by a flicker function computed from the determined flicker frequency and the estimated flicker amplitude and phase, and calculating the flicker energy in the corrected column vector. It is then determined if the flicker energy can be further reduced. If not, the estimated flicker amplitude and phase are used to determine the flicker function. If yes, the estimates of the flicker amplitude and phase are improved, a further corrected column vector is computed, and the flicker energy is calculated using the further corrected column vector. The procedure is repeated until the flicker energy cannot be further reduced.

Once the flicker energy has been minimized, the flicker can be removed from the image data by dividing the image data by the determined flicker function.

The method of the present invention has the advantage of being effective in removing flicker produced by any periodically varying light source such as a fluorescent light source. Any exposure period can be used with the method of the invention; and, as a result, the method can be used to capture images with greatly reduced flicker under even bright fluorescent illumination. The present invention provides a method and apparatus for removing image artifacts from images that operate on a single image, that do not require any additional input other than values of the flicker and frame periods, and that do not require that the flicker be independently monitored. Furthermore, the invention provides embodiments with other features and advantages in addition to or in lieu of those described above. Many of these features and advantages are apparent hereinafter in conjunction with the following drawings and detailed description of exemplary embodiments of the invention.

BRIEF DESCRIPTION OF THE DRAWINGS

FIG. 5 is an image of raw data from a single color plane of a CMOS image sensor utilizing a rolling shutter, and FIG. 6 is an image achieved as a result of applying a flicker correction according to an embodiment of the present invention;

FIG. 7 is a flow chart illustrating steps of a method for removing image artifacts from an image according to an embodiment of the present invention;

FIG. 8A is a flow chart illustrating the step of determining flicker function in FIG. 7 in greater detail, according to another embodiment of the present invention;

FIG. 8B is a flow chart illustrating the step of determining flicker phase and amplitude in FIG. 8A in greater detail, according to another embodiment of the present invention.

DETAILED DESCRIPTION OF THE EXEMPLARY EMBODIMENTS OF THE INVENTION

Figure 1:
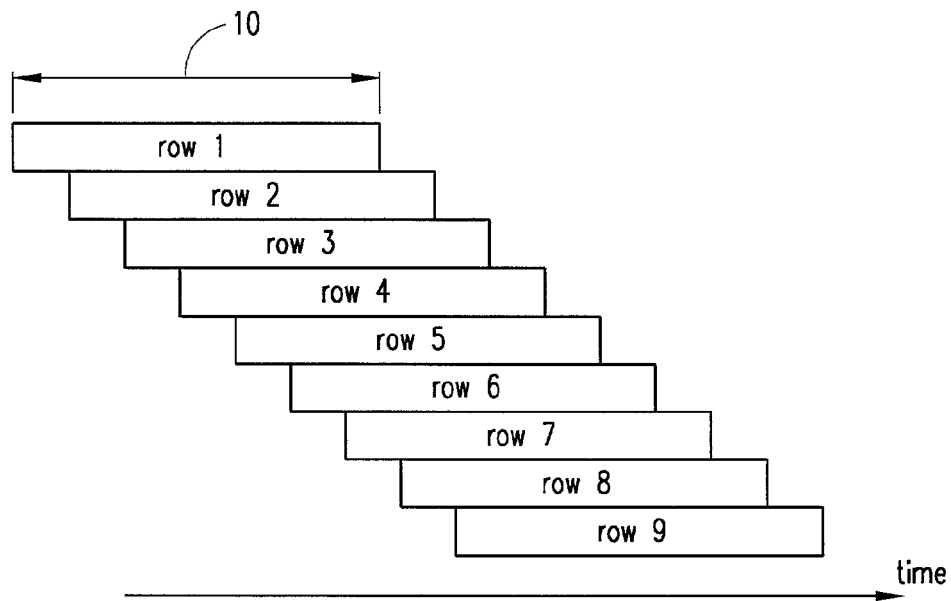
FIG. 1 is a diagram that schematically illustrates the operation of a rolling shutter to assist in providing a clear understanding of the present invention.
Figure 2:
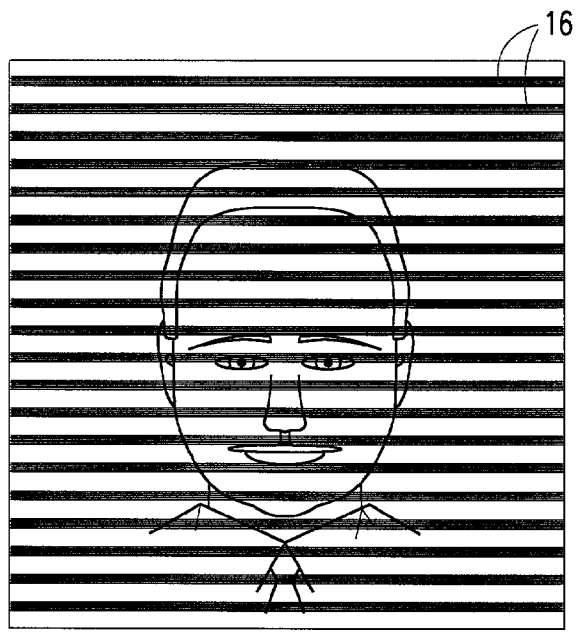
FIG. 2 is a schematic image that illustrates the effect of flicker on the output of a CMOS image sensor utilizing a rolling shutter.

In a CMOS image sensor operating in a rolling shutter mode, the exposure interval of an image data array varies from row to row in the array as shown in FIG. 1 (although within a particular row, all pixels are exposed over the same interval). If the intensity of the light source illuminating a scene being imaged varies over time, row-to-row light intensity variations may result in the image data. If the row interval is fixed and the intensity of the light source varies periodically with time, the intensity variations will appear as image artifacts in the form of periodic horizontal bars in an image created from the image data.

If the integration period is made equal to an integer multiple of the flicker period, the amplitude of the horizontal bars will be zero. An a priori determination of the amplitude of the bars is generally not possible, however, because the characteristics of the light source are not known. In addition, the vertical alignment of the horizontal bar pattern with respect to the image is dependent on the phase of the light flicker at the beginning of the exposure interval; however, similar to the amplitude, the phase also cannot be determined in advance.

The flickering of a fluorescent light is caused by the alternation of the power supply of the light. A fluorescent tube contains a filament that emits electrons into a cloud of mercury vapor atoms. The vapor atoms become excited and emit ultraviolet (UV) light. When the UV light strikes the envelope of the fluorescent tube, the UV light excites phosphors on the inside surface of the tube. The phosphors then fluoresce and emit white light.

The emission of electrons is maximized at the peaks of the drive voltage of the power source. Since there are two peaks per cycle, the flicker frequency becomes twice the drive voltage frequency. Accordingly, a fluorescent tube that is powered by a 60 Hz electrical system will flicker at 120 Hz.

The function $(1+\alpha \sin^2(\omega t+\Phi))$ can be used to model the emission of a fluorescent tube. In this expression, $\alpha$ is the flicker amplitude, $\omega$ is the flicker frequency, and $\Phi$ is the flicker phase. The flicker function can also be expressed in terms of the row number of the rows in an image array as follows:

$$f(j)=1+\alpha \sin^2(j\omega T_f/N+\Phi) \qquad 1$$

Figure 3:
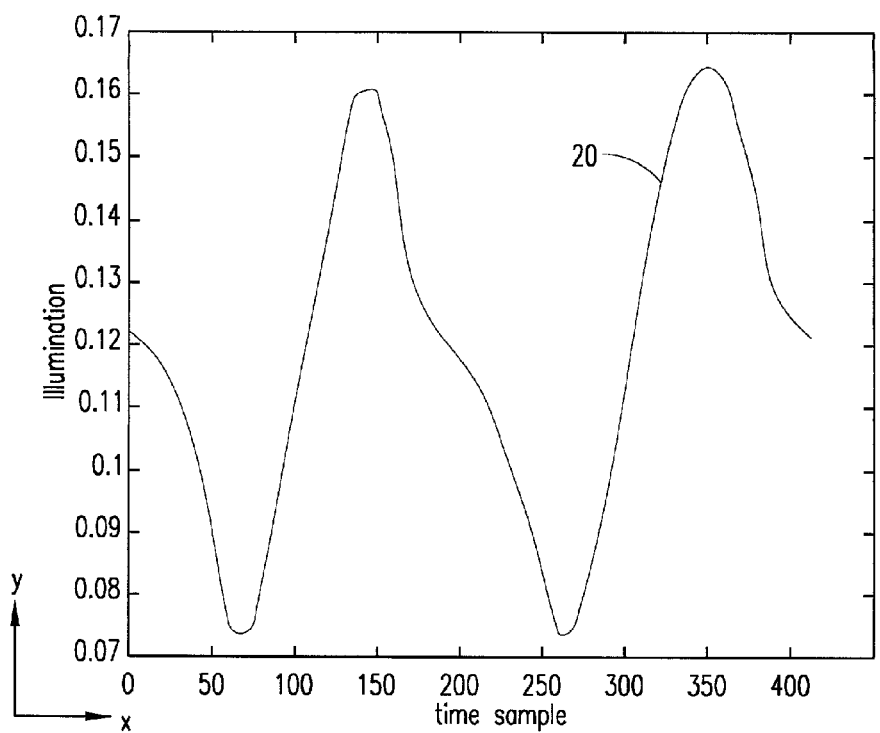
FIG. 3 is a graph that illustrates the emission characteristics of a fluorescent tube.

In this expression, $T_f$ is the frame period, and N is the number of lines per frame. The actual emission of a fluorescent tube has a more complicated time variation as illustrated by the curve 20 in FIG. 3 which is a graph in which the x-axis represents a time sample and the y-axis represents illumination. This function decays slowly because of the characteristics of the phosphors and the filament in the fluorescent tube. Accordingly, a more complicated flicker function than given in Equation (1) above could be created, if desired, to better match the curve.

According to an embodiment of the present invention, the image artifacts are removed from an image by dividing the image data representing the image by the flicker function on a row-by-row basis. If the image is represented by the two-dimensional data array I[i, j], the operation of removing the image artifacts is described by:

$$I'[i,j] = I[i,j]/f(j). \qquad 2$$

The flicker function, according to an embodiment of the invention, is determined by determining the flicker frequency, flicker amplitude and flicker phase of the of the illuminating light source. The flicker frequency, flicker amplitude and flicker phase are determined, according to an embodiment of the invention, by summing pixels along every row of the digital image to create a column vector, determining the flicker frequency from the product of the frame period and the AC line frequency in cycles per image frame, and determining the flicker amplitude and phase by minimizing flicker energy in a corrected column vector.

More particularly, to create a column vector, all of the columns of the image data array are added together to produce a column average. This operation collapses the two-dimensional image data array into a one-dimensional vector. The operation can be described by the following equation:

$$C[j] = \frac{1}{M} \sum_i I[i, j] \qquad 3$$

In this equation, M is the number of columns in the image data.

To minimize the flicker energy in a corrected column vector in order to determine the flicker amplitude and phase, an initial estimate is first made of the flicker amplitude and phase. A corrected column vector is then computed by dividing the created column vector by a flicker function calculated from the determined flicker frequency and the estimated flicker amplitude and phase. The flicker energy is then calculated in the corrected column vector, and a determination is made whether the flicker energy can be reduced any further. If not, the estimated flicker amplitude and phase are used to determine the flicker function. If yes, an improved estimate of the flicker amplitude and phase are made, and the process is repeated until the flicker energy cannot be reduced any further.

The flicker energy in the corrected column vector is determined by computing the sine and cosine transforms of C[j]/f(j). The energy is the square root of the square of the two terms, normalized by the mean value of the image data.

$$Xs = \sum_j A(j)\sin(j\omega T_f/N)C[j]/f(j) \qquad 4$$

-continued
$$Xc = \sum_j A(j)\cos(j\omega T_f/N)C[j]/f(j) \qquad 5$$

In equations (4) and (5), A(j) is an apodization function that is used to prevent discontinuities at the edges of the image frame from contributing to the energy value. Examples of such functions include the Hanning and Hamming functions.

The flicker energy is:

$$E_f = \sqrt{Xs + Xc}/\langle C \rangle \qquad 6$$

In equation (6), the image data mean has been determined from the column averages.

Figure 4:
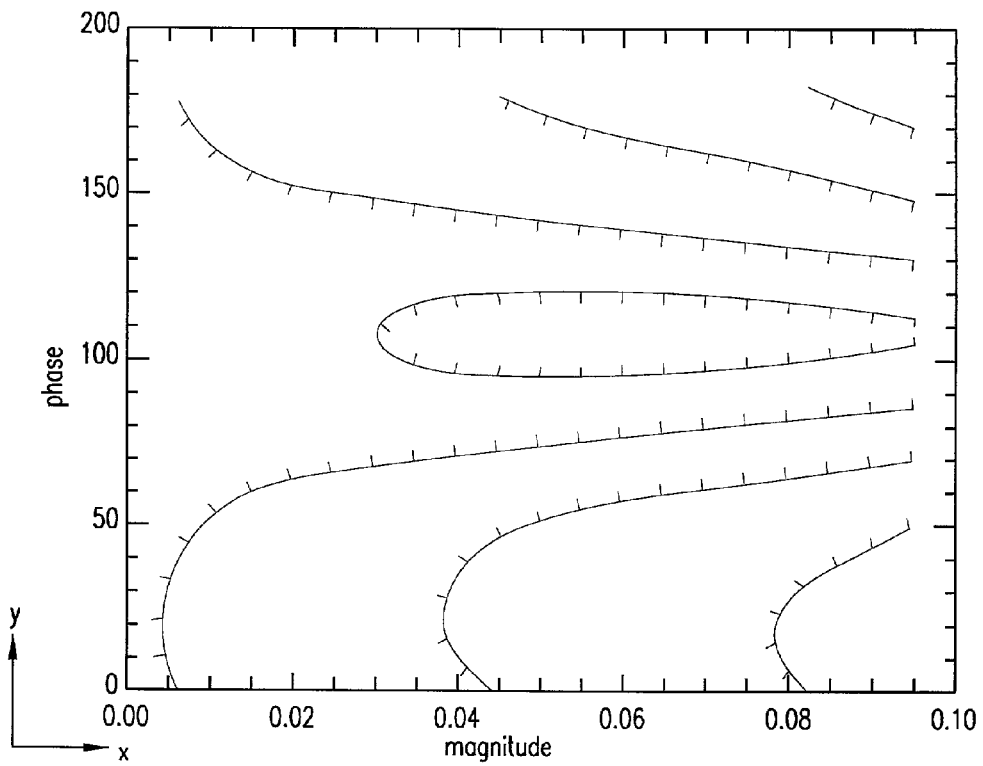
FIG. 4 is a graph that illustrates a flicker correction according to an embodiment of the present invention.

The surface defined by the variation of the flicker energy as a function of amplitude and phase is plotted in FIG. 4 in which the x-axis represents magnitude and the y-axis represents phase. As illustrated in FIG. 4, the function is smooth with a well-defined, unique minimum.

Once the flicker energy has been minimized, image artifacts can be removed from the entire image by dividing the image data by the determined flicker function, using the calculated values of flicker frequency and the values of flicker phase and amplitude that result from the minimization.

Figure 5:
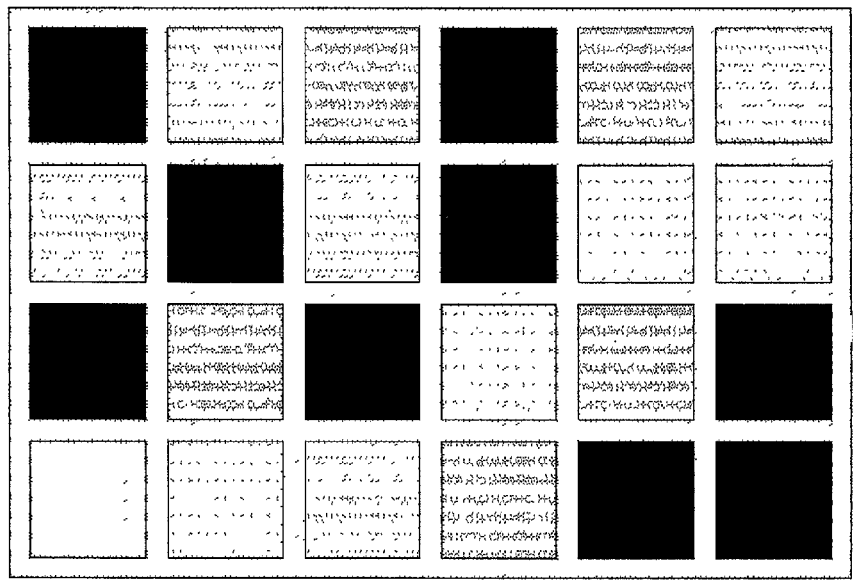
FIGS. 5 and 6 are images that demonstrate the effectiveness of a method and apparatus according to an embodiment of the present invention.
Figure 6:
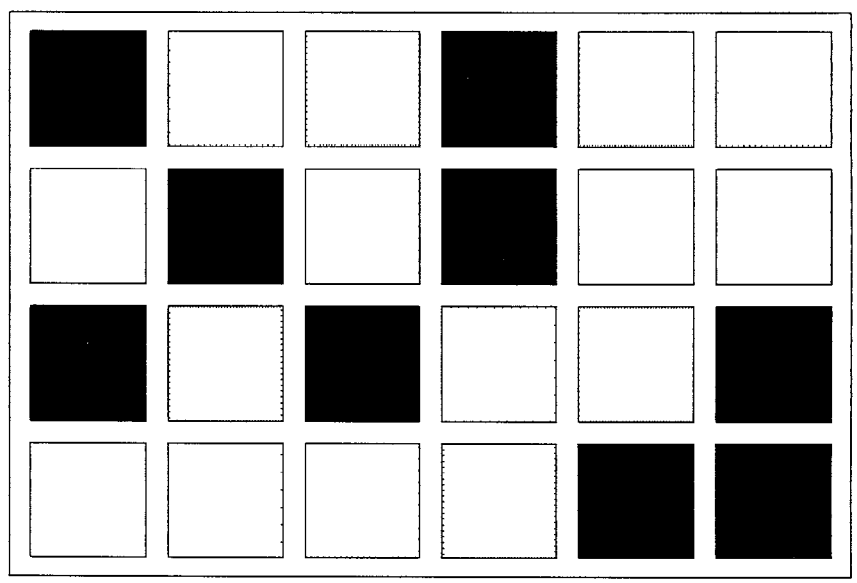

FIGS. 5 and 6 are images that demonstrate the effectiveness of the method according to an embodiment of the present invention. The image of FIG. 5 consists of raw data from a single color plane of a CMOS image sensor, i.e, an original image. The image of FIG. 6 is the result of applying the flicker correction according to an embodiment of the present invention, i.e., a flicker corrected image. As is apparent from examining FIGS. 5 and 6, the horizontal lines present in the image of FIG. 5 have been eliminated in the image of FIG. 6.

FIG. 7 is a flow chart that generally illustrates a method for removing image artifacts from an image of a scene according to an embodiment of the invention. As shown in FIG. 7, the method comprises determining a flicker function that models light emission of a light source that illuminates the scene in step 30; and, thereafter, processing the image data that represents the image of the scene using the flicker function in step 40.

FIG. 8A is a flow chart that illustrates the step of determining the flicker function in FIG. 7 in greater detail according to another embodiment of the invention. In particular, as discussed previously, to determine the flicker function of a light source that illuminates a scene being imaged, the flicker frequency, the flicker amplitude and the flicker phase of the light source are determined. This is accomplished as disclosed in FIG. 8A by first summing the pixels of the image array along every row of the image array to create a column vector as illustrated in step 50. The flicker frequency is determined from the product of the frame period and the AC line frequency in cycles per image frame as shown in step 60. The flicker phase and the flicker amplitude are determined by minimizing flicker energy in a corrected column vector as shown in step 70.

The step of determining flicker phase and amplitude shown in FIG. 8A is described in greater detail in FIG. 8B. Specifically, an initial estimate of the flicker amplitude and phase is made as shown in step 72. Thereafter, a corrected column vector is computed by dividing the column vector created in step 50 of FIG. 8A by an estimated flicker function in step 74. The estimated flicker function is computed using the flicker frequency determined in step 60 of FIG. 8A and the flicker amplitude and flicker phase estimated in step 72 of FIG. 8B. The flicker energy in the corrected column vector is then calculated in step 76, and a determination is made whether the flicker energy can be further reduced in step 78. If no, the initial estimate of flicker amplitude and phase made in step 72 is used to determine the flicker function. If yes, an improved estimate of the flicker amplitude and phase is made in step 80, a further corrected column vector is computed in step 74, and a new flicker energy is calculated in step 76. The procedure is repeated until the flicker energy cannot be reduced any further, i.e., a no determination is made in step 78.

Figure 9:
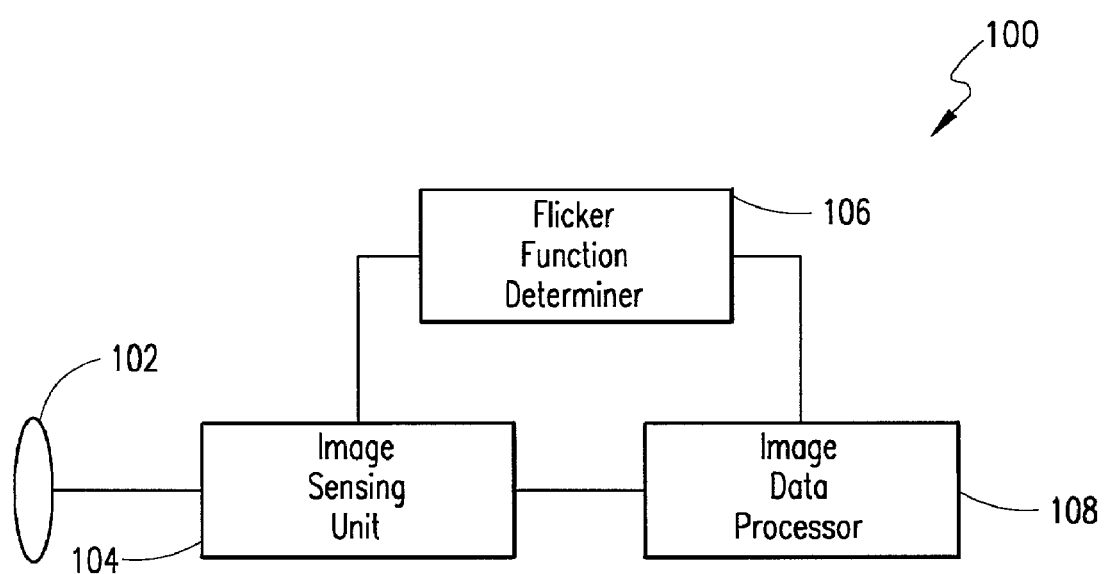
FIG. 9 schematically illustrates an apparatus for removing image artifacts from an image according to another embodiment of the present invention.

FIG. 9 schematically illustrates an apparatus for removing image artifacts from an image of a scene according to an embodiment of the present invention. The apparatus comprises an imaging device, such as a digital camera, generally designated by reference number 100. The imaging device includes optical system 102, represented by a lens in FIG. 9, for receiving light from a scene and for focussing the light on an image sensing unit 104, such as a CMOS image sensor. The image sensing unit converts the light pattern thereon into an array of voltage samples that are digitized by an analog-to-digital converter that may be included in the image sensing unit.

A flicker function determiner 106, determines the flicker function of the light source from the digital image data by determining the flicker frequency, flicker amplitude and flicker phase of the light source as described previously; and an image data processor 108 processes the image data using the flicker function to remove image artifacts from a resultant image of the scene.

While what has been described constitutes exemplary embodiments of the invention, it should be recognized that the invention can be varied in numerous ways without departing from the scope thereof. Accordingly, it should be understood that the invention should be limited only insofar as is required by the scope of the following claims.

The invention claimed is:

1. A method for removing image artifacts from an image of a scene illuminated by a light source, said image represented by image data, the method comprising:
    determining a flicker function, wherein said flicker function is a function of flicker frequency, determined from a product of the frame period and a line frequency in cycles per image frame of said light source, flicker amplitude and flicker phase of said light source, and
    processing said image data using said flicker function so as to remove image artifacts from said image, wherein said image data comprises an image data array comprised of a plurality of rows of image data, and wherein said processing step comprises dividing said image data by said flicker function on a row-by-row basis.

2. The method according to claim 1, wherein said step of determining a flicker function includes determining the flicker frequency from a product of frame period and AC line frequency in cycles per image frame.

3. The method according to claim 2, wherein said step of determining a flicker function further includes summing pixels of said image data array along every row of said array to create a column vector, and further includes determining said flicker phase and said flicker amplitude by minimizing flicker energy in a corrected column vector.

4. The method according to claim 3, wherein said step of minimizing flicker energy in a corrected column vector comprises:
    making an estimate of flicker amplitude and phase;
    computing a corrected column vector by dividing the created column vector by a flicker function calculated using the determined flicker frequency and the estimated flicker amplitude and phase;
    calculating the flicker energy in the corrected column vector;
    determining whether the flicker energy can be further reduced; and
    if the flicker energy cannot be further reduced, using the estimated flicker amplitude and phase to determine the flicker function, and, if the flicker energy can be further reduced, repeating the steps of making an estimate of flicker amplitude and phase, computing a corrected column vector and calculating the flicker energy until the flicker energy cannot be reduced any further.

5. The method according to claim 1, wherein said light source comprises a periodically varying light source.

6. The method according to claim 5, wherein said periodically varying light source comprises a fluorescent light source.

7. The method according to claim 6, wherein said flicker function, expressed in terms of row number of the rows of said image data array, is:

$$f(j)=1+\alpha \sin^2(j\omega T_f/N+\Phi)$$

where $\alpha$ is flicker amplitude, $\omega$ is flicker frequency, $\Phi$ is flicker phase, $T_f$ is frame period, and N is a number of rows per image frame.

8. The method according to claim 1, wherein said image data is collected from a CMOS image sensor utilizing a rolling shutter to provide exposure control.

9. A method for removing image artifacts from an image of a scene illuminated by a periodically varying light source, said image represented by an image data array comprising a plurality of rows of image data, the method comprising:
    determining a flicker function that models light emission of the periodically varying light source, wherein said flicker function is a function of flicker amplitude, flicker frequency and flicker phase of the periodically varying light source, and
    processing said image data using said flicker function so as to remove said image artifacts from said image, wherein said step of determining a flicker function includes summing pixels along every row of the image data array to create a column vector, determining the flicker frequency from a product of frame period and AC line frequency in cycles per image frame, and determining flicker amplitude and phase by minimizing flicker energy in a corrected column vector.

10. The method according to claim 9, wherein said step of minimizing flicker energy in a corrected column vector comprises:
    making an estimate of flicker amplitude and phase;
    computing a corrected column vector by dividing the created column vector by a flicker function calculated using the determined flicker frequency and the estimated flicker amplitude and phase;
    calculating the flicker energy in the corrected column vector;
    determining whether the flicker energy can be further reduced; and
    if the flicker energy cannot be further reduced, using the estimated flicker amplitude and phase to determine the flicker function, and, if the flicker energy can be further reduced, repeating the steps of making an estimate of flicker amplitude and phase, computing a corrected column vector and calculating the flicker energy until the flicker energy cannot be reduced any further.

11. The method according to claim 9, wherein said image data is collected from a CMOS image sensor utilizing a rolling shutter to provide image control.

12. A method for removing image artifacts from an image of a scene illuminated by a periodically varying light source, said image represented by an image data array comprising a plurality of rows of image data, the method comprising:

determining a flicker function that models light emission of the periodically varying light source, wherein said flicker function is a function of flicker amplitude, flicker frequency and flicker phase of the periodically varying light source, and processing said image data using said flicker function so as to remove said image artifacts from said image, wherein said periodically varying light source comprises a fluorescent light source, and wherein said flicker function, expressed in terms of row number of the rows of said image data array is:

$$f(j) = 1 + \alpha \sin^2(j\omega T_f/N + \Phi)$$

where $\alpha$ is a flicker amplitude, $\omega$ is a flicker frequency, $\Phi$ is flicker phase, $T_f$ is frame period, and N is a number of rows per image frame.

13. Apparatus for removing image artifacts from an image of a scene illuminated by a light source, comprising:

a unit for providing image data representing said scene:

a flicker function determiner for determining a flicker function, wherein said flicker function is a function of flicker frequency, determined from a product of the frame period and a line frequency in cycles per image frame of said light source, flicker amplitude and flicker phase of said light source, and wherein said flicker function determiner includes means for determining said flicker frequency, said flicker amplitude and said flicker phase; and an image data processor that processes said image data using said flicker function to remove said image artifacts from said image, wherein said image data comprises an image data array comprised of a plurality of rows of image data, and wherein said image data processor processes said image data by dividing said image data by said flicker function on a row-by-row basis.

14. The apparatus according to claim 13, wherein said light source comprises a fluorescent light source.

15. A digital imaging method comprising the steps of:

determining a flicker function by analyzing a digital image; and processing said digital image using said flicker function so as to reduce image artifacts from said digital image, wherein said determining step involves determining values of parameters associated with an a priori flicker model, wherein said parameters comprise a flicker frequency, determined from a product of the frame period and a line frequency in cycles per image frame, a flicker amplitude and a flicker phase, and wherein said processing step involves dividing said digital image by said flicker function.

16. The digital imaging method according to claim 15, wherein said step of determining flicker frequency, flicker amplitude and flicker phase comprises summing pixels along every row of the image data array to create a column vector, determining the flicker frequency from a product of frame period and AC line frequency in cycles per image frame; and determining flicker amplitude and phase by minimizing flicker energy in a corrected column vector.

17. The digital imaging method according to claim 16, wherein said step of minimizing flicker energy in a corrected column vector comprises:

making an estimate of flicker amplitude and phase;

computing a corrected column vector by dividing the created column vector by a flicker function calculated using the determined flicker frequency and the estimated flicker amplitude and phase;

calculating the flicker energy in the corrected column vector;

determining whether the flicker energy can be further reduced; and if the flicker energy cannot be further reduced, using the estimated flicker amplitude and phase to determine the flicker function, and, if the flicker energy can be further reduced, repeating the steps of making an estimate of flicker amplitude and phase, computing a corrected column vector calculating the flicker energy until the flicker energy cannot be reduced any further.

* * * * *

UNITED STATES PATENT AND TRADEMARK OFFICE
CERTIFICATE OF CORRECTION

PATENT NO. : 7,298,401 B2  Page 1 of 1
APPLICATION NO. : 09/927201
DATED : November 20, 2007
INVENTOR(S) : Baer It is certified that error appears in the above-identified patent and that said Letters Patent is hereby corrected as shown below:

Column 8, line 30, in Claim 7, delete "Φis" and insert -- Φ is --, therefor.

Column 10, line 45, in Claim 17, after "vector" insert -- and --.

Signed and Sealed this

Eighth Day of April, 2008

JON W. DUDAS
*Director of the United States Patent and Trademark Office*